July 28, 1970 K. E. CORCORAN ET AL 3,522,340

INJECTION MOLDING PROCESS

Original Filed July 31, 1967

INVENTOR.
Kenneth F. Corcoran
Robert F. Filippini.
by Kenway, Jenney & Hildreth
Attys.

United States Patent Office 3,522,340
Patented July 28, 1970

3,522,340
INJECTION MOLDING PROCESS
Kenneth E. Corcoran, Boston, and Robert F. Filippini, Bridgewater, Mass., assignors to Joseph F. Shoe Co. Inc., Stoughton, Mass., a corporation of Massachusetts
Continuation of application Ser. No. 657,108, July 31, 1967. This application Sept. 17, 1969, Ser. No. 860,163
Int. Cl. B29c *17/08;* B29d *3/02;* B29h *7/08*
U.S. Cl. 264—161                                           1 Claim

ABSTRACT OF THE DISCLOSURE

A process of injection molding shoe bottoms employing a nozzle with ports in its sidewalls within the body of an impaled sole piece of leather or other wear material.

---

This application is a continuation of Ser. No. 657,-108, filed July 31, 1967, now abandoned.

This invention comprises a new and improved process of making injection molded shoe bottoms with an inserted sole piece of leather or other wearing material.

It has been the practice heretofore to employ a nozzle which projects from the face of the mold and extends entirely through the sole piece which is impaled and held in position thereby. The injected plastic material is thus directed through the sole piece without contact therewith and forms a solid sprue that must be removed from the plastic ply molded in the die cavity. The shoe bottom is thus left with a conspicuous hole that must be plugged or covered in the finished shoe.

We have discovered that by providing the sides of the nozzle with ports or outlet passages located well within the body of the impaled sole piece certain desirable results are achieved. In the first place, the sprue formed in such a nozzle is connected with the molded plastic ply in the shoe bottom so that when the shoe is removed from the mold the sprue tends to break off adjacent to its outer end and fill the hole in the sole piece. The necessity in the second place, the integral connection thus obviated.

In the second place, the integral connection thus formed between the plastic ply and the sprue tends to anchor against displacement all the component parts of the shoe bottom, and finally the appearance of the finished sole is ornamented by the impression of a pattern of concentric segments formed when a nozzle of castelated configuration is employed.

These and other features of the invention will be best understood and appreciated from the following description of a preferred manner of carrying it out selected for purposes of illustration and shown in the accompanying drawings in which—

Figure 1:
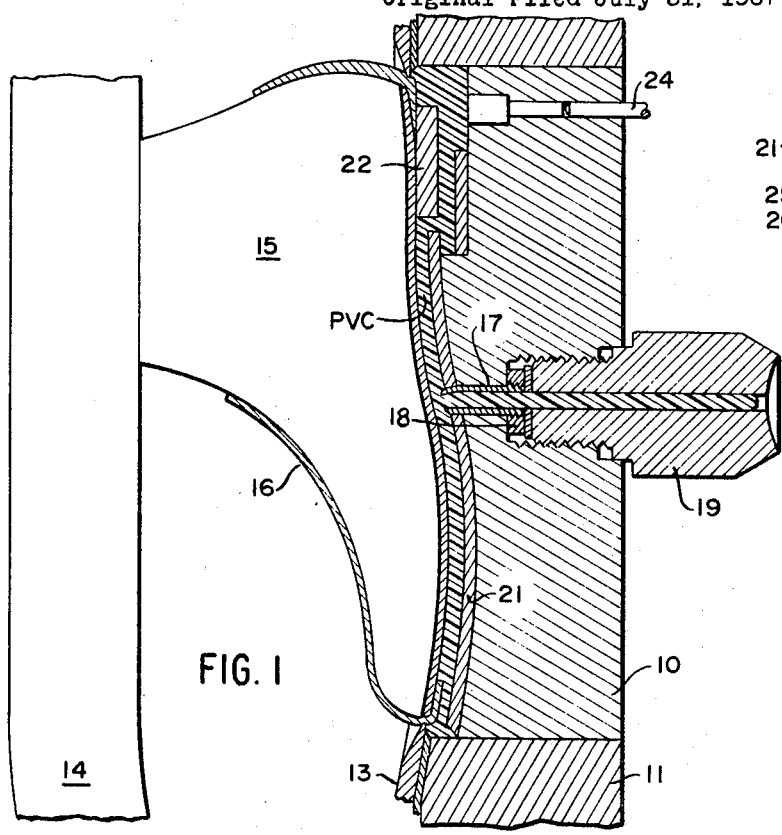
FIG. 1 is a view showing the closed mold in longitudinal section.

The improved nozzle of our invention is herein shown as embodied in molding apparatus more fully described in U.S. Letters Pat. Nos. 3,006, 032, Oct. 31, 1961, and 3,175,249, Mar. 30, 1965.

In the accompanying drawings are shown mold members which are movable as an assembly in a machine having a source of PVC which is maintained at an injection temperature of 350–390° F. The mold members include a sole mold plate 10 mounted in a frame 11 and having an upright face which is curved to an approximate contour of the lasted shoe bottom. At the opposite sides of the sole mold are side mold plates to which are secured welt-forming plates 13 adapted to mold the marginal edges of the injected PVC into the shape of a conventional welt.

To the frame 11 is hinged an arm 14 carrying a last-like form 15 upon which the lasted shoe 16 is located. The sole mold 10 is shaped to receive an inserted sole piece 21 with its toe end down and the hinged arm 14 is so arranged as to present the lasted shoe bottom in complementary position when the mold is closed.

The sole mold is provided with a nozzle 17 arranged to project outwardly from the face of the mold plate 10 in a position approximating the shank of the sole piece. The nozzle is received in a bore in the mold plate 10 and has threaded connection with a nut 18 having a screwdriver slot by which the nut may be turned to advance or retract the nozzle. The nut 18 is backed up by a plug 19 which is threaded into the rear side of the sole mold. In adjusting the nozzle 17 it is contemplated that shims or washers 20 may be interposed between the nut 18 and the inner end of the plug 19 in order to back up the nozzle and prevent leakage of the PVC. The plug 19 constitutes a threaded connection by which PVC is delivered to the nozzle 17 and the plug in turn is arranged to register with tubular connections extending from the source of PVC not shown.

A sole piece 21 is shown in the drawings as positioned by and impaled upon the nozzle 17. To this end it may be slightly tapered so that it will fit tightly in a hole provided for it in the preformed sole piece. The discharge end of the nozzle may be beveled on the side toward the toe end of the sole piece in order to facilitate flow of the PVC in that direction.

The heel portion of the sole mold is recessed to receive a top lift 22 and at this point is located a tell-tale plunger 24 which is advanced by the PVC when the mold cavity has been entirely filled and thus serves to actuate a cutoff for the PVC.

The discharge end of the nozzle 17 is slotted to define four concentric segments 25 and these alternate with outlet passages or ports 26 which extend inwardly into substantially flush relation with the surface of the mold 10. The segments 25 are of uniform width and circumferentially spaced in a circle. As clearly shown in FIG. 2 the outlet passages or ports of the nozzle lie within the body of the sole piece 21 which is impaled on the end of the nozzle.

The nozzle has an effective length substantially equal to the thickness of the sole piece and it is slightly tapered at its outer end by having the segments 25 bent inwardly or beveled.

Figure 2:
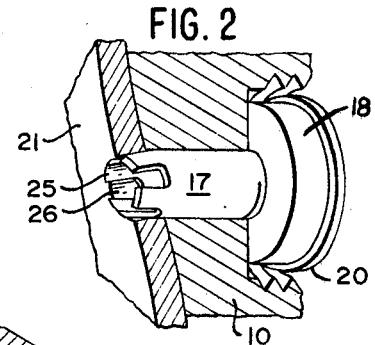
FIGS. 2–6 are fragmentary views on a larger scale showing the discharge end of the nozzle in relation to the work.
Figure 3:
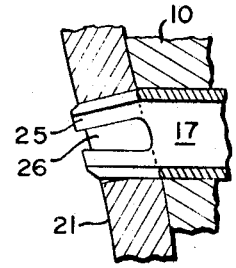
Figure 4:
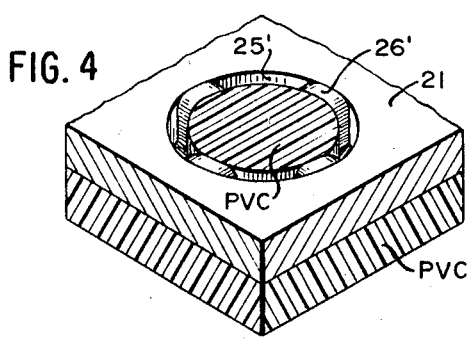

As shown in FIG. 2 the segments 25 of the nozzle extend through the sole piece 21 while the passages 26 open within the body of the sole piece so that PVC passing out through the passages makes binding contact with the material of the sole piece. It will be noted also that the bottoms of the outlet passages are arranged to follow the curvature of the surface of the mold 10 from which the nozzles project.

Figure 5:
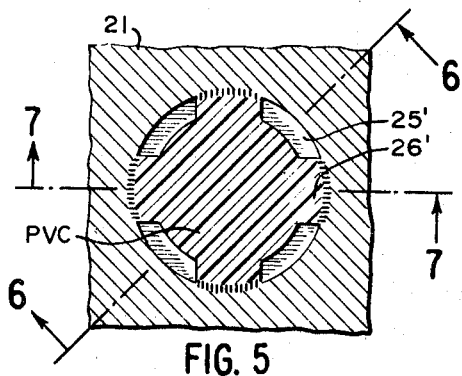
Figure 6:
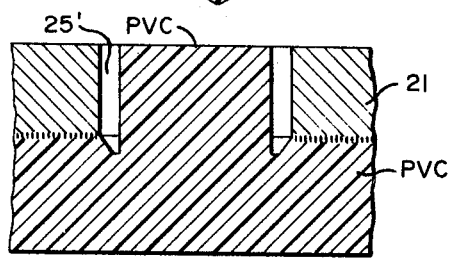
Figure 7:
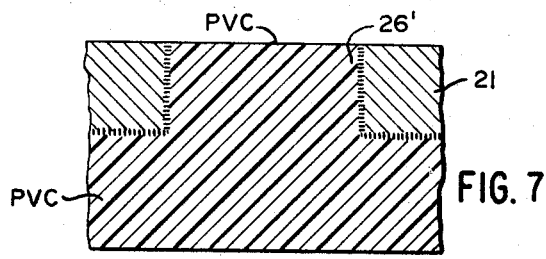
FIG. 7 is a cross sectional view of the PVC sprue.

In FIG. 5 the sprue, marked PVC, is shown in cross section as bonded to the sole piece 21 in four spaced segments. FIG. 7 is an enlarged cross sectional view on the line 7—7 of FIG. 5 and FIG. 6 is a similar cross sectional view on the line 6—6 of FIG. 5 showing spaces 25' where the segments 25 of the nozzle have been withdrawn.

Having thus disclosed our invention what we claim as new and desire to secure by Letters Patent is:

1. An injection molding process which comprises providing a nozzle projecting into a mold cavity from one wall thereof and having at its end a circle of spaced concentric projections;

impaling a sole piece on said nozzle so that said spaced projections are located within the body of the sole piece, said sole is positioned against said wall, and the lower portons of said projections extend into substantially flush relation with said wall;

injecting fluid plastic material through said nozzle into said cavity completely to fill the mold and the spaces between said projections;

and removing the molded article from the cavity after the molding material has hardened so that the sprue formed by the molding material in the nozzle may be broken off adjacent said wall.

References Cited

UNITED STATES PATENTS

| | | | |
|---|---|---|---|
| 3,175,249 | 3/1965 | Ferreira | 264—261 X |
| 3,178,496 | 4/1965 | Ferreira | 264—328 X |

ROBERT F. WHITE, Primary Examiner

A. M. SOKAL, Assistant Examiner

U.S. Cl. X.R.

18—30; 264—244, 273

UNITED STATES PATENT OFFICE
CERTIFICATE OF CORRECTION

Patent No. 3,522,340　　　　　　　　　　　　　　　July 28, 1970

Kenneth E. Corcoran et al.

It is certified that error appears in the above identified patent and that said Letters Patent are hereby corrected as shown below:

In the heading to the printed specification, lines 4 and 5, "Joseph F. Shoe Co. Inc." should read -- Joseph F. Corcoran Shoe Co. Inc. --.

Signed and sealed this 16th day of February 1971.

(SEAL)
Attest:

Edward M. Fletcher, Jr.　　　　　　　　　　WILLIAM E. SCHUYLER, JR.
Attesting Officer　　　　　　　　　　　　　　Commissioner of Patents

UNITED STATES PATENT OFFICE
CERTIFICATE OF CORRECTION

Patent No. 3,522,340　　　　　　　　Dated July 28, 1970

Inventor(s) Kenneth F. Corcoran et al.

It is certified that error appears in the above-identified patent and that said Letters Patent are hereby corrected as shown below:

In the heading to the sheet of drawings, line 1.
"K. E. CORCORAN ET AL" should read -- K. F. CORCORAN ET AL --.
In the heading to the printed specification, line 3,
"Kenneth E. Corcoran" should read -- Kenneth F. Corcoran --.
Column 1, lines 39 to 41, should read -- The necessity for an additional step of plugging or covering is thus obviated. --.

Signed and sealed this 11th day of May 1971.

(SEAL)
Attest:

EDWARD M. FLETCHER, JR.
Attesting Officer

WILLIAM E. SCHUYLER, JR.
Commissioner of Patents